US006901082B1

(12) United States Patent
Purse (10) Patent No.: US 6,901,082 B1
(45) Date of Patent: May 31, 2005

(54) METHOD AND APPARATUS FOR COMMUNICATING INFORMATION

(75) Inventor: Christopher Michael Purse, Chelmsford (GB)

(73) Assignee: Nortel Networks, Ltd., St. Laurent (CA)

(*) Notice: Subject to any disclaimer, the term of this patent is extended or adjusted under 35 U.S.C. 154(b) by 0 days.

(21) Appl. No.: 09/276,080

(22) Filed: Mar. 25, 1999

(30) Foreign Application Priority Data

Dec. 22, 1998 (GB) ............................................. 9828367

(51) Int. Cl.$^7$ .................................................. H04J 3/04
(52) U.S. Cl. ..................................... 370/535; 370/907
(58) Field of Search .............................. 370/466, 532, 370/535–544, 545, 907, 395.51; 359/115, 114; 398/43–51

(56) References Cited

U.S. PATENT DOCUMENTS

| | | | | |
|---|---|---|---|---|
| 5,065,396 A | * | 11/1991 | Castellano et al. | ......... 370/536 |
| 5,257,261 A | * | 10/1993 | Parruck et al. | ............. 370/541 |
| 5,706,285 A | * | 1/1998 | Saijonmaa et al. | ......... 370/391 |
| 5,715,252 A | * | 2/1998 | Sato | ........................... 370/543 |
| 6,298,038 B1 | * | 10/2001 | Martin et al. | ............... 370/216 |

FOREIGN PATENT DOCUMENTS

EP 0874487 A2 4/1998

OTHER PUBLICATIONS

Andersson et al, Silicon Bipolar Chipset for SONET/SDH 10 Gb/s Fiber–Optic Communication Links, IEEE, vol. 30, No. 3, pp. 210–218, Mar. 1995.*

* cited by examiner

Primary Examiner—Frank Duong
(74) Attorney, Agent, or Firm—Barnes & Thornburg (57) ABSTRACT

A method and apparatus for transporting a supercarrier signal over a network span is described. The apparatus includes a network for transporting the supercarrier signal, which includes messaging information, using a first protocol. The apparatus further includes a network span comprising a plurality of low bit rate network sections for transporting a plurality of trib signals using a second protocol, and a transparent demultiplexer connected to the network and the network span for demultiplexing the supercarrier signal into the trib signals. The demultiplexer is arranged to insert into the plurality of trib signals the messaging information required to maintain said first protocol. The apparatus also includes a multiplexer, connected between the network span and the network, for transparently multiplexing the trib signals into the supercarrier signals. Also described is a transparent multiplexer and a transparent demultiplexer.

9 Claims, 10 Drawing Sheets

× Bytes reserved for national use

• Unscrambled bytes. Therefore care should be taken with their content

△ Media dependent bytes

NOTE - All unmarked bytes are reserved for future international standardization (for media dependent, additional national use and other purposes).

METHOD AND APPARATUS FOR COMMUNICATING INFORMATION

BACKGROUND TO THE INVENTION

This invention relates to a method of communicating information in a communication system and is applicable, in particular but not exclusively, to a synchronous optical network employing synchronous digital hierarchies (SDH), or equivalent protocols.

SUMMARY OF THE PRIOR ART

In order to facilitate communication across an optical network, fully synchronous digital hierarchies (SDH) have been developed. These hierarchies enable lower transmission rate signals to be added to and dropped from higher rate network stages. The SDH protocol divides the data transmitted over the network into frames (of 125 $\mu$s), referred to as a synchronous transport module (STM) with the base rate (STM-1) of 155.520 megabits per second (Mbit/s). High data rate signals are obtained by byte-interleaving an appropriate number of STM-1 signals. This allows high capacity nodes to be established throughout the network; a managed network can then efficiently route and distribute traffic between nodes, dropping off data to exchanges for traffic switching.

The basic STM frame (also known as VC4) structure comprises of a number of rows of payload, each preceded by transport overhead bytes. The transport overhead bytes contain operation administration, maintenance and provisioning information (OAM&P) and are used for functions such as framing, error monitoring, synchronisation signalling, orderwire, signal conditioning and multiplexing. This transport overhead manages traffic between Add/Drop multiplexers (ADM) and repeaters in the network. The payload is used to provide end-to-end communication between systems carrying digital voice, video, data or other signals which are multiplexed onto the signal. A payload pointer within the transport overhead is employed to designate the start of the payload within the STM frame. Higher data rates are achieved by multiplexing a number of STM frames, N. The transport overhead bytes is terminated and a new STM-N transport overhead is generated for the new STM-N frame. The STM frame also contains a path overhead (POH) which is not terminated when the STM frames are multiplexed.

When designing and subsequently deploying telecommunication systems that are optical fibre based, it is important that multiple distinct routes exist between end-to-end connections within the network. More particularly, since information transfer is reliant upon the physical properties of the fibre system it is essential for network operators to be able to maintain physical end-to-end connections. The network operator therefore necessarily builds redundancy into the deployed cabling scheme to provide protection against cabling breaks that disrupt certain paths.

European Patent Application Number 874487-A describes a system for transporting a plurality of tributary ("trib") signals over a high rate network span, in which the trib signals are transparently multiplexed into a supercarrier signal. However, this system assumes that only small sections of the network will be upgraded to a higher data rate connection. Transparent multiplexing requires continuity of payloads and associated overheads bytes necessary to maintain a lower data rate network across a higher rate span. The lower rate network operated as if it were directly connected without the higher rate mid section. Thus the lower rate protocol used by the trib signals, e.g. STM-16, is maintained through the section of the network employing an higher rate protocol for the supercarrier signal, e.g. STM-64. That is, essential messaging information such as data communications information (datacomms, D bytes) protocol protection information (K bytes) and other desirable transport overhead information is passed transparently through the network span.

Whilst the network operator may employ high data rate connections in most parts of the optical network, external constraints may require certain sections of the network to use a lower data rate connection. For example, certain spans of the network may need to cover very long distances between repeaters, requiring lower data rate connections that can be engineered to have a longer reach. Alternatively, network operators may be constrained to use sections of existing networks constructed form older or lower specified fibres.

Significant problems arise from the use of lower data rate spans in a higher data rate synchronous optical networks. It would be desirable to provide an improved infrastructure which is flexible, allows multi-rate networks to function efficiently and which accentuates the reliability of the networks without imposing unnecessary expense on the network operator.

SUMMARY OF THE INVENTION

According to a first aspect of the invention there is provided a method of transporting a supercarrier signal over a network span comprising the steps of: transmitting said supercarrier signal, including messaging information, using a first protocol; transparently demultiplexing said supercarrier signal into a plurality of trib signals; transmitting said trib signals over said network span using a second protocol; and whereby the messaging information required to maintain said first protocol is included in said trib signals.

The plurality of trib signals may then be transparently multiplexed into said supercarrier signal, since the messaging information required to maintain the first protocol across the network span is present in the plurality of trib signals.

According to a second aspect of the invention there is provided apparatus for transporting a supercarrier signal over a network span including: a network for transporting said supercarrier signal, including messaging information, using a first protocol; a network span comprising a plurality of low bit rate network sections for transporting a plurality of trib signals using a second protocol; a transparent demultiplexer connected to said network and said network span for demultiplexing said supercarrier signal into said trib signals; and wherein said demultiplexer includes means for inserting into said plurality of trib signals the messaging information required to maintain said first protocol.

The apparatus may include a multiplexer, connected to said network span and said network for transparent multiplexing said trib signals into said supercarrier signal and for extracting the messaging information required to maintain said first protocol from said plurality of trib signals.

According to a third aspect of the invention there is provided a transparent demultiplexer comprising: an input for receiving the supercarrier signal, transported using a first protocol; a plurality of outputs for transmitting a plurality of trib signals using a second protocol; means for demultiplexing said supercarrier signal into said trib signals; and means for extracting messaging information, required to maintain said first protocol, from the supercarrier signal and inserting said messaging information into the trib signals.

According to a fourth aspect of the invention there is provided a transparent multiplexer comprising: an output for transmitting a supercarrier signal using a first protocol; a plurality of inputs for receiving a plurality of trib signals transported using a second protocol; means for multiplexing said trib signals into said supercarrier signal; and means for extracting messaging information from the trib signals and using said messaging information to required to maintain said first protocol.

The network span typically has a first end terminated by a transparent demultiplexer and a second end terminated by a transparent multiplexer, although multiplexing and demultiplexing functionality could be provided a both ends for bi-directional communication.

In yet another aspect of the present invention there is provided an optical communication network arranged to support, using a first protocol, the carriage of a supercarrier signal including messaging information through the optical communication network, the optical communication network further including: a network span comprising at least one low bit rate network section for transporting a plurality of trib signals using a second protocol; a transparent demultiplexer connected to said network span for demultiplexing said supercarrier signal into said trib signals; and wherein said demultiplexer includes means for inserting into said plurality of trib signals the messaging information required to maintain said first protocol.

The optical communication system is typically in the form of a loop. In a preferred embodiment, the network span further comprises a plurality of low bit rate network sections providing parallel communication paths across the network span.

One advantage of the invention is that transport overhead information which would be terminated by a straight demultiplexer/multiplexer arrangement is transparently transported in the trib signals and is thus maintained across the network span. Switching from a first protocol to a second "pseudo" protocol is transparent to the rest of the network and the integrity of the first protocol is maintained.

Another advantage of the invention is that the overhead required to maintain a network protocol across a network span using a different protocol is considerably reduced.

For example, a network managed using an STM-64 protocol may include a span comprising four STM-16 network sections in parallel. The messaging information from the STM-64 supercarrier signal required to maintain the STM-64 protocol is inserted into the spare bytes of one or more of the STM-16 trib signals. Thus the integrity of the STM-64 protocol is maintained over the network span without the considerable overhead of transmitting the STM-64 transport overhead in its entirety over the STM-16 network span.

BRIEF DESCRIPTION OF THE DRAWINGS

An exemplary embodiment of the present invention will now be described in detail, using by way of example an SDH STM-64 optical network, with reference to the accompanying drawings, in which.

DETAILED DESCRIPTION OF A PREFERRED EMBODIMENT

Figure 1:
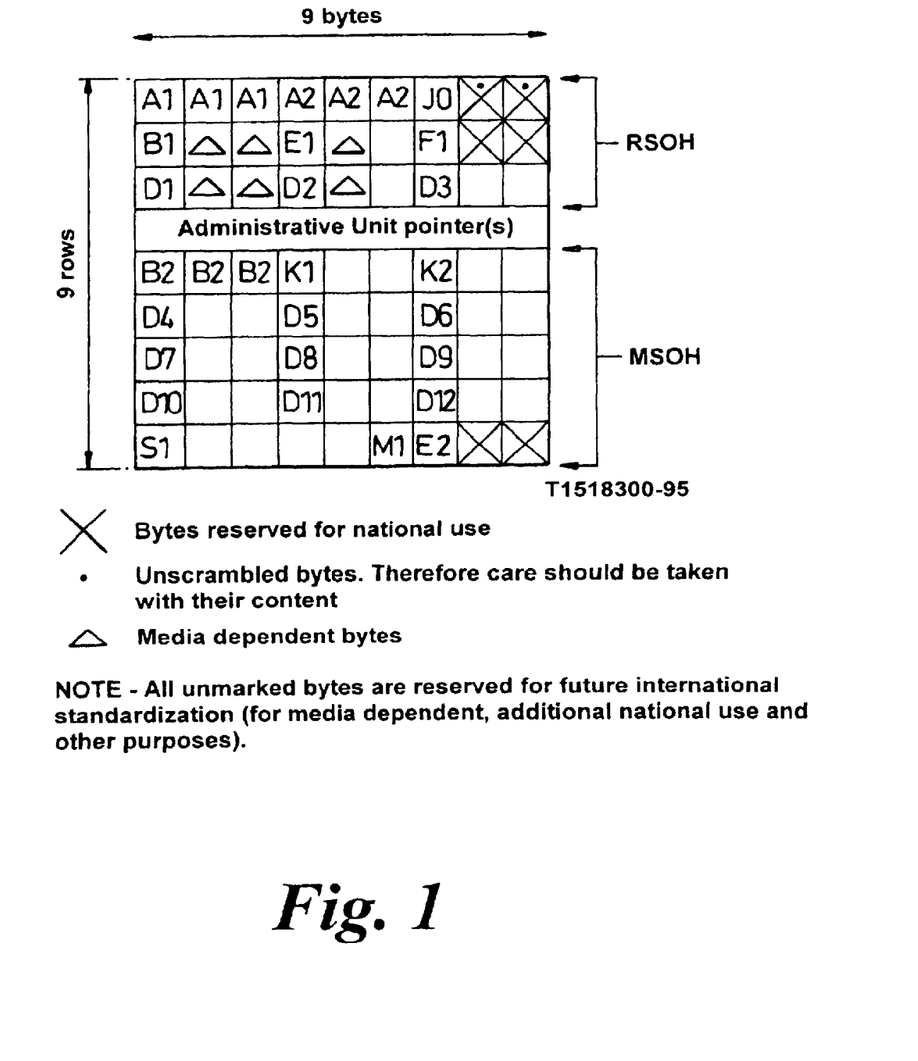
FIG. 1 is a diagram of the transport overhead according to the SDH Standard.

The necessary background and terms used herein are provided in the following description in connection with FIG. 1, which is a diagram showing the byte allocation in the transport overhead (TOH) and path overhead (POH) according to the synchronous digital hierarchy (SDH) standard.

The SDH standard ITU-T G.707 and ITU-T G.783, SONET standards ANSI T1.105 and Bellcore GR-253-CORE, define the physical interface, optical line rate known as STM-N signals (VC4), a frame format, overhead information. The user signals are converted into a standard electrical format called the synchronous transport module (STM), which is the equivalent of the optical signal. The STM-1 frame consists of 270 columns by nine rows of bytes, the frame length is 125 micro seconds.

As such, STM-1 has a rate of 155.520 Mb/s and higher rates (STM-N, STM-Nc) are built from STM-1. The add/drop multiplexer multiplexes various STM-N input streams which are then interfaced onto optical fibre channels.

An SDH frame comprises a transport overhead (TOH) consisting of nine columns and nine rows, and a synchronous payload envelope (SPE) comprising 261 columns, one column for the path overhead (POH) and 260 columns for the payload. The TOH includes a regeneration section overhead field (RSOH) consisting of nine columns and three rows (3×3), and a multiples section overhead (MSOH) field consisting of nine columns and six rows (9×6).

The regeneration section (RS) deals with the transport of multiplexed signals across the physical medium. A section is a portion of the transmission facility between two section terminating equipment (STE), such as regenerators and terminals.

The RSOH includes framing bytes A1, A2 which consist of a unique bit sequence indicating the beginning of an STM-1 frame. Byte J0 is now used to physically identify the fibres and is present in the first STM-1 (STM-1 #1) of a STM-N signal, while byte Z0 represents and additional growth byte in all remaining STM-1s (STM-1 #2 to STM-1 #N). Section error monitoring byte B1 is defined for STM-1 #1. A bit interleaved parity (BIP-8) code is placed in the B1 byte of STM-1 before scrambling. Its value is an 8-bit code using even parity, calculated over all bits of the previous STM-N frame after scrambling.

Local orderwire (LOW) byte E1 provides a 64 Kb/s channel between section entities, and it is proposed as a voice channel for craftspersons and for communications between regenerators, hubs and remote terminal locations.

Byte F1 is the RS user byte set aside for the network provider's purposes. It is passed from one section level entity to another and is terminated at all section level equipment. It can be read/written at each section terminating equipment, and is defined only for STM-1#1.

The multiplex section (MS), of the SDH standard provides synchronisation and multiplexing for the path layer.

An MS is a portion of the transmission facility between two consecutive line terminating equipment (LTE), which could be add-drop multiplexes (ADM) or terminals (TM). And ADM multiplexes/demultiplexes signals into/from a higher rate signal. It accesses signals that need to be dropped or inserted at the ADM site, the rest of the traffic continuing straight through (pass through).

Byte B2 is for MS error monitoring and is provided in all STM-1 signals in a STM-N.

Automatic Protection Switching (APS) bytes K1 and K2 are used for signalling between MS entities for automatic protection switching, for indicating line Alarm Inhibit Signal (AIS) and Line Remote Defect Indicator (RDI).

The path layer of SDH deals with the transport of services, such as 140 MBit, between path terminating equipment (PTE). The main function of the path layer is to map the services and path overhead (POH) into STM-1s, which is the format required by the MS layer.

In a practical system two parallel systems are provided along each network section, one for protection and one for working. These are not shown in the accompanying figures for clarity.

Figure 2:
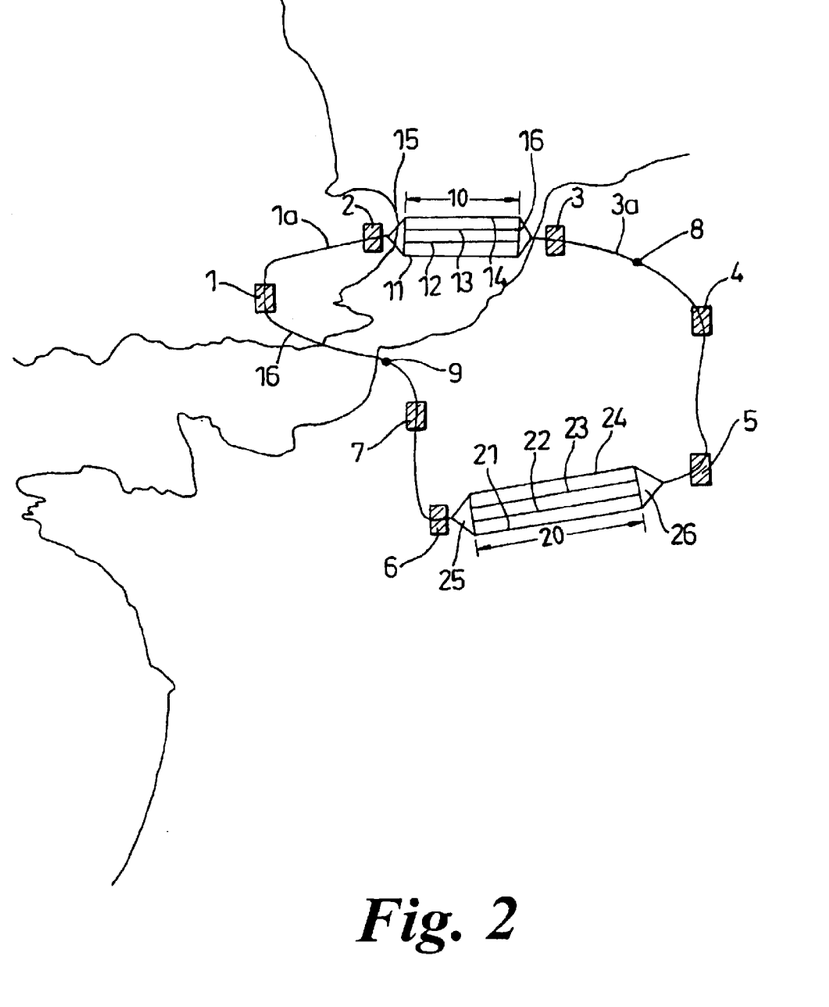
FIG. 2 shows in outline a network having two spans, each made up of a plurality of low-capacity connections.

FIG. 2 illustrates an example of a fibre optic network, implemented for example in Northern Europe, of STM-64 connections (1a, 1b, 2, 3a) between Add/Drop multiplexers (1–7) and repeaters (8, 9) and including two spans (10, 20) each made of four STM-16 connections (11 to 14 and 21 to 24). Each span (10, 20) is terminated by an inverse transparent multiplexer (IMUX, 15, 16, 25, 26). The network functions as a ring for improved reliability and traffic may pass around the network in both clockwise and anticlockwise directions.

Figure 3:
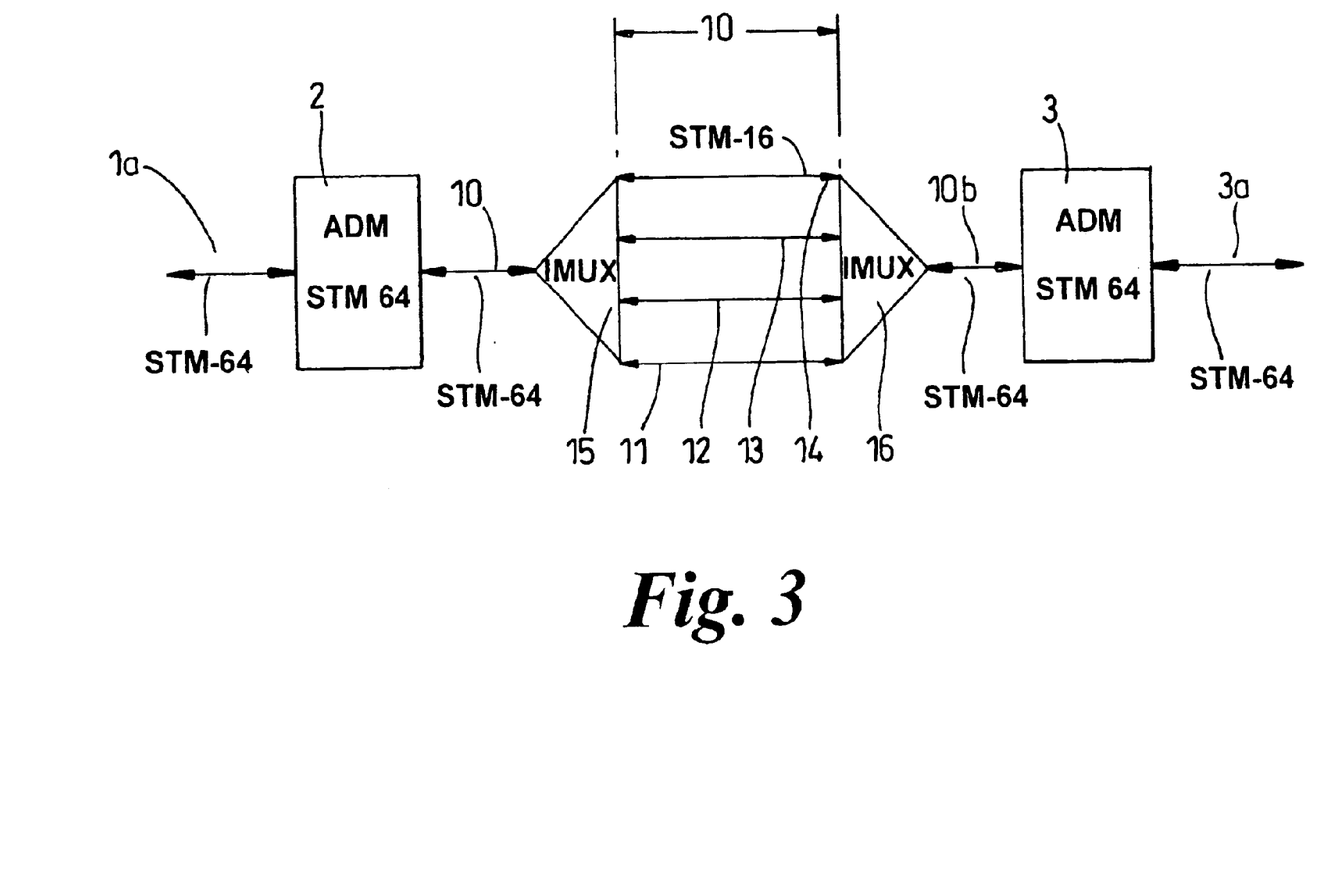
FIG. 3 shows in outline an inverse transparent demultiplexer arrangement.

FIG. 3 shows in more detail the network span 10. An STM-64 Add/Drop multiplexer (ADM, 2, 3) is provided at either end of the network span 10. A short length of STM-64 connection (10a, 10b) between the IMUX (15, 16) and the ADM (2, 3) is illustrated for clarity only and may not be present in a practical system. The IMUX 15 transparently demultiplexes the STM-64 signal from the ADM 2 into four STM-16 signals passes each signal along an STM-16 connection (11 to 14). The IMUX 16 re-multiplexes the four STM-16 signals into an STM-64 signal which is passed along to the ADM 3. Since traffic passes in both directions around the network, the same happens in reverse (i.e. ADM 3 to ADM 2).

Figure 4:
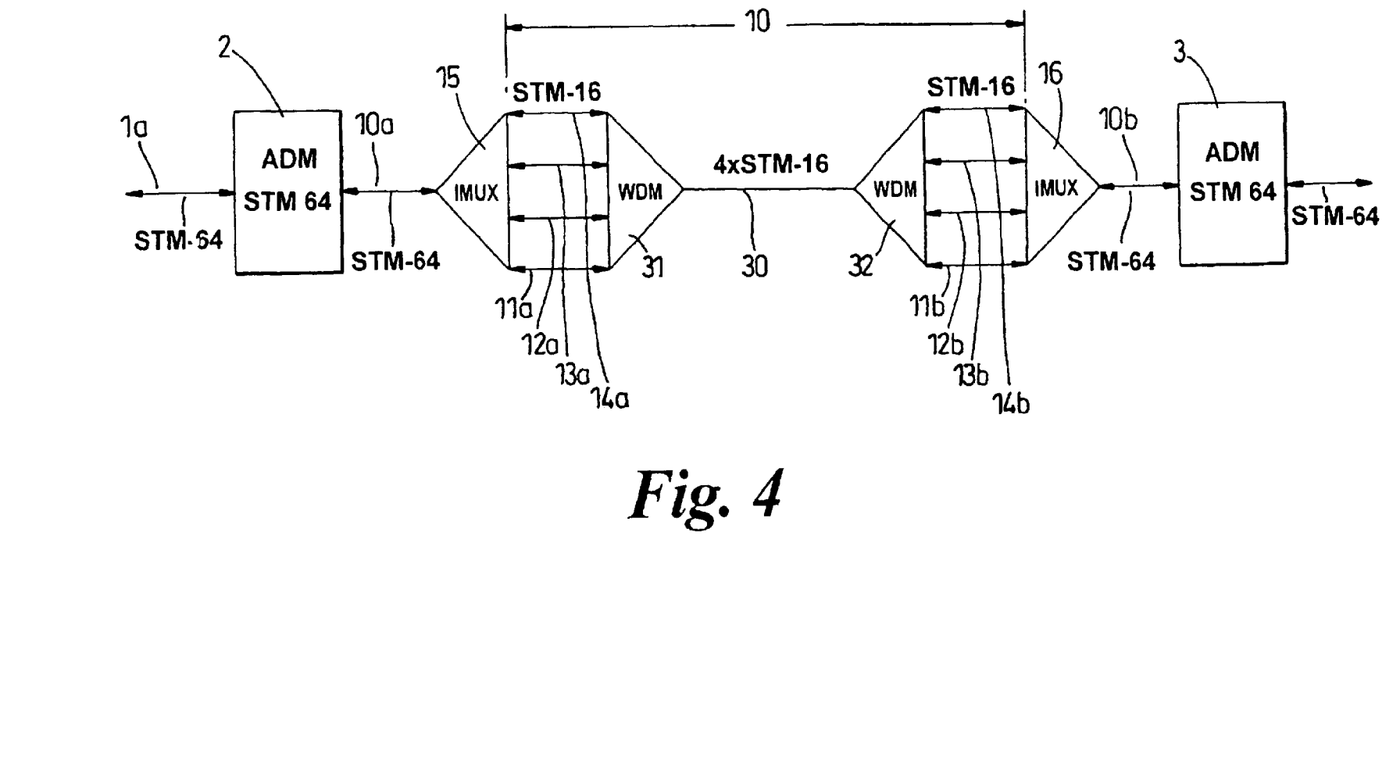
FIG. 4 shows in outline another inverse transparent demultiplexer arrangement.

FIG. 4 illustrates an alternative embodiment in which the four STM-16 signals provided by IMUX 15 are multiplexed along a single 4×STM-16 fibre 30 by wavelength divisional multiplexer (WDM) 31. WDM 32 demultiplexes the four STM-16 wavelength multiplexed signals which are then remultiplexed by IMUX 16 into an STM-64 signal. As above, traffic may pass in both directions and thus the same function is performed in reverse (ADM 3 to ADM 2).

Figure 5:
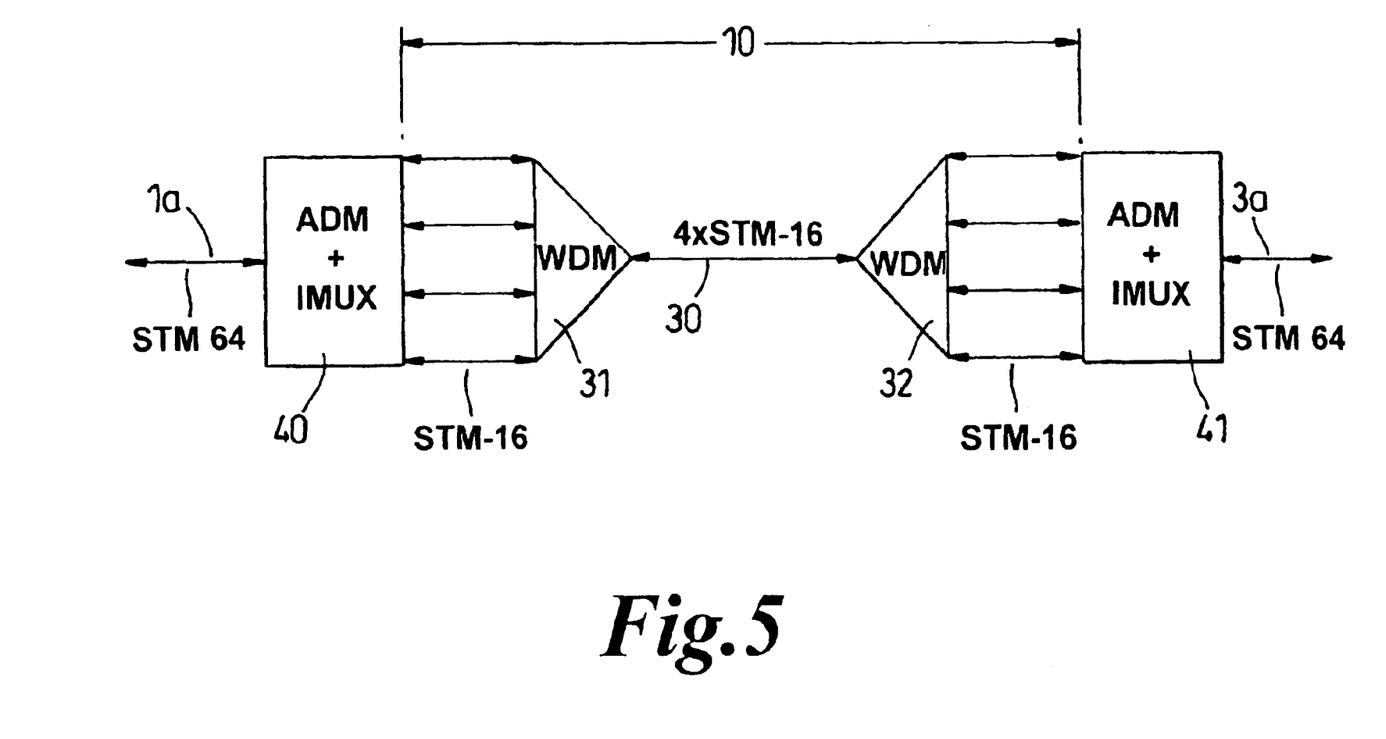
FIG. 5 shows in outline a combined add/drop multiplexer and inverse transparent demultiplexer.

FIG. 5 illustrates another embodiment in which the functionality of the ADM and the IMUX are combined. Signals passing along network section 1a which are in STM-64 format are transparently demultiplexed into four STM-16. The STM-16 signals may be passed along four STM-16 connections directly or, as illustrated, the STM-16 signals may be wavelength multiplexed by WDM 31 and passed along a 4×STM-16 connection 30 to be wavelength demultiplexed by WDM 32 and remultiplexed into an STM-64 signal by ADM 41. Once again, the same function may be performed in reverse (ADM 41 to ADM 40).

In order to maintain protection switching of the network, whether linear or ring, the APS bytes K1 and K2 of the STM-64 signals must be passed between IMUXs, and therefore along all STM-16 sections, unaltered.

Since the K2 byte is passed, the MS-AIS and line RDI indications may also be passed through automatically.

Figure 6:
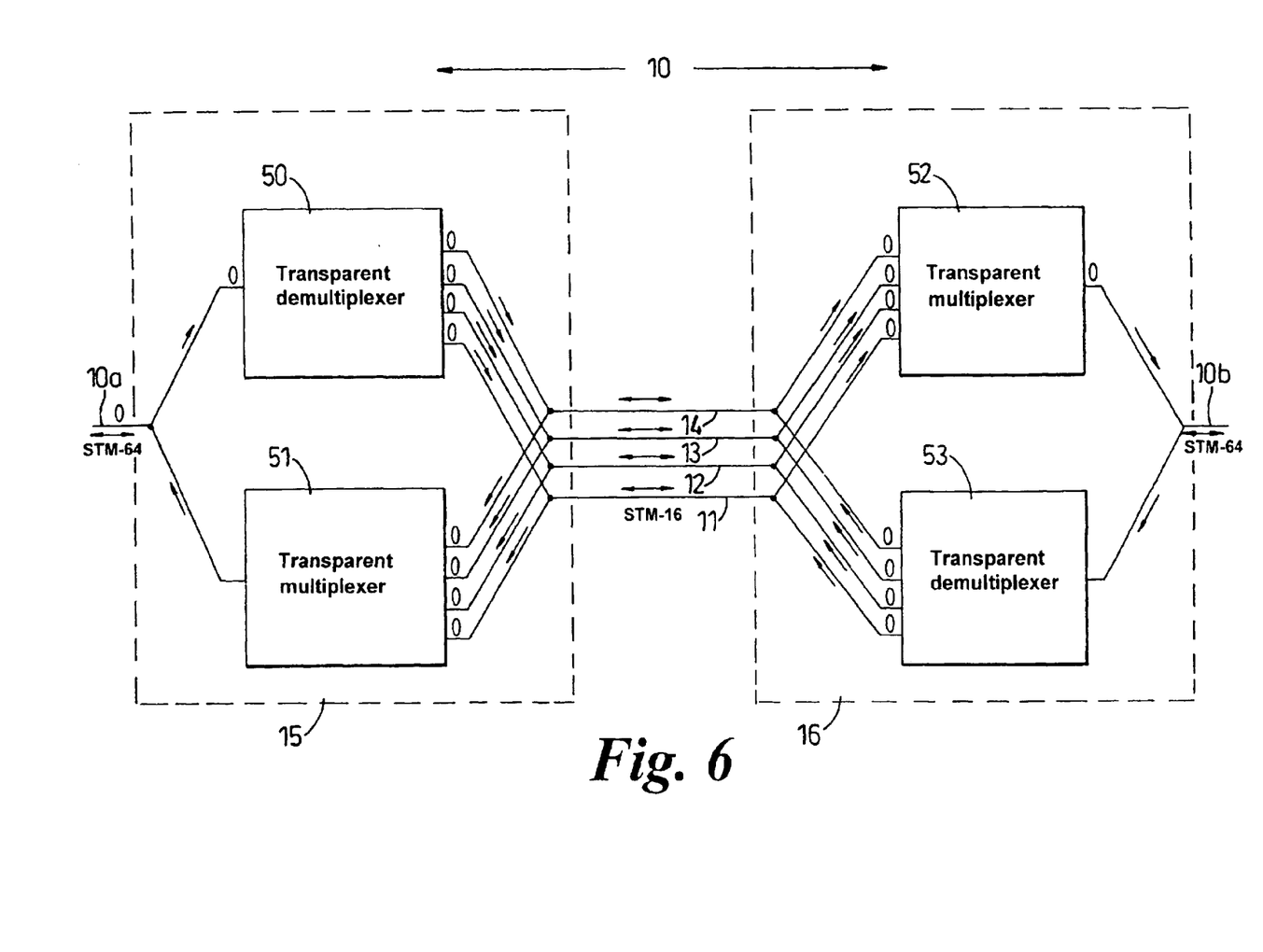
FIG. 6 shows in outline a network span with transparent multiplexers and transparent demultiplexers at either end.

Since traffic may pass in both directions along the STM-16 network span, an arrangement comprising a transparent demultiplexer 50, 53 and a transparent multiplexer 51,52 would be provided at each end. The example shown in FIG. 6 uses the network span arrangement of FIG. 3.

Figure 7:
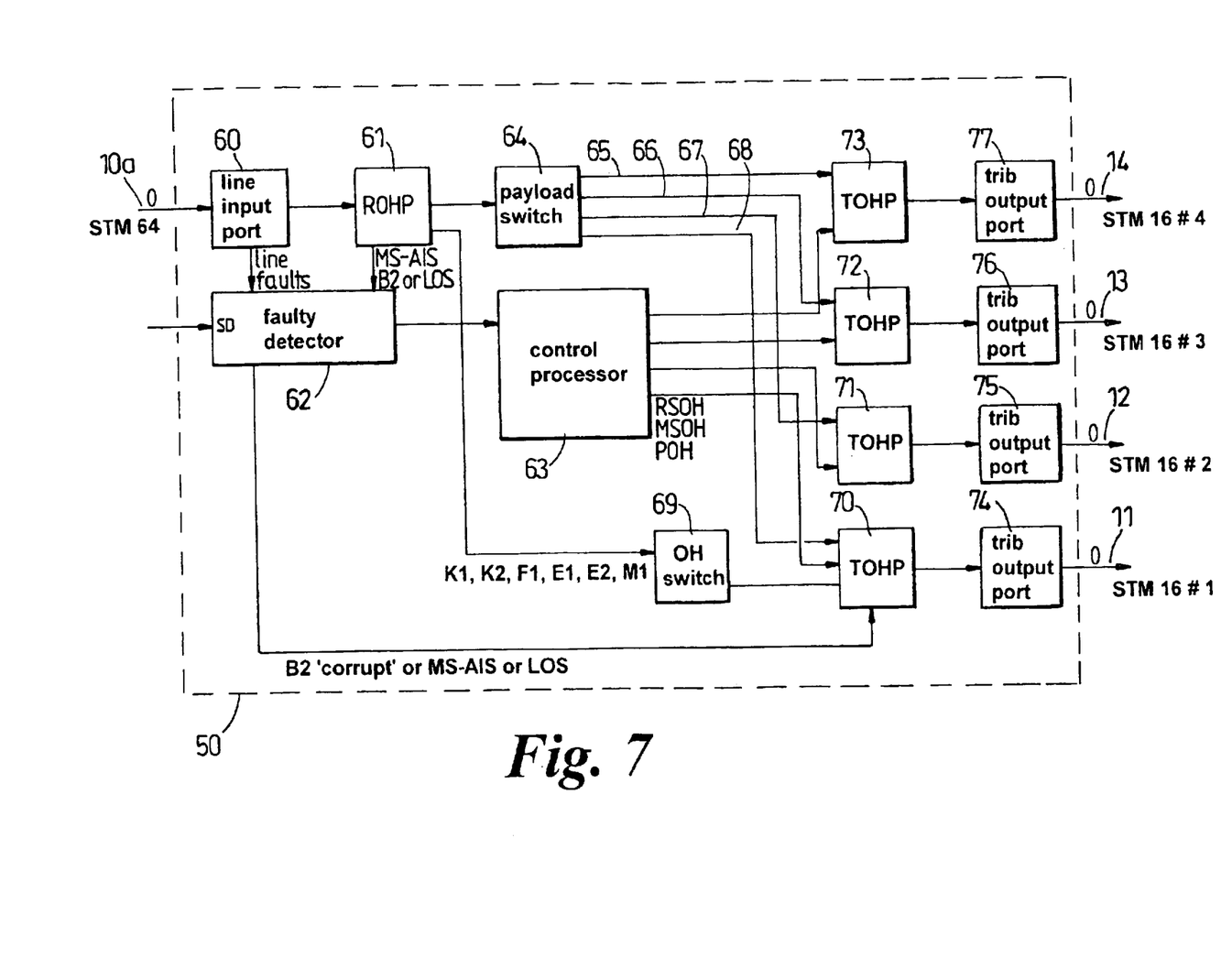
FIG. 7 is a block diagram of a transparent demultiplexer according to a preferred embodiment of the invention.

FIG. 7 shows a block diagram of a transparent multiplexer according to the invention. An STM-64 signal is received at line input port 60, which converts optical signals to electrical signals. Receive overhead processor 61 (ROHP) separates out the transport overhead bytes, performs pointer processing on the payload (as described in ITU-T G.707), passes fault and performance information (LOS, MS-AIS, B2) to the fault detector 62 and transport overhead information (RSOH, MSOH, & VC4 POH) to the control processor 63. The payload switch 64 demultiplexes the supercarrier STM-64 signal by directing appropriate sets of STM-16 frames to the appropriate STM-16 trib path (65–68). The mapping of the payloads is direct, i.e. STM-64, VC4 1 . . . 16=STM-16 #1, . . . , STM-64 VC4 49.64=STM-16 #4. The ROHP also separates out the messaging information used to maintain the STM-64 protocol through the STM-16 network span. The overhead switch 69 maps this messaging information into spare bytes of the STM-16 trib signals. In the example shown in FIG. 6, essential messaging information of APS bytes K1 and K2 and desirable bytes F1, E1, E2 and M1 are mapped. Also by way of example, these bytes are inserted into only one of the STM-16 trib signals by trib overhead processor (TOHP) 70, but it would be possible to spread the messaging information throughout the trib signals.

The control processor and the TOHPs 70–73 generate a new trib overhead for each of the STM-16 signals. The output from each TOHP is processed by a trib output port (74–77) from electrical signals to optical signals.

Fault detector 62 is provided for detecting errors or signal fault conditions on the incoming STM-64 supercarrier signal. The fault detector has a threshold detector set for a predetermined level of signal degradation (SD). B2 is monitored to count the RS, MS and path coding violations and is compared with the SD threshold. If B2 is below the SD threshold it is passed on to TOHP 70 which corrupts the equivalent B2 byte in the STM16 #1 to #4 to the error rate determined by the fault detector. If B2 is above the threshold the MS-AIS of STM 16 #1 will be set. The LOS of STM 16 #1 will be set if a signal fault is detected.

Figure 8:
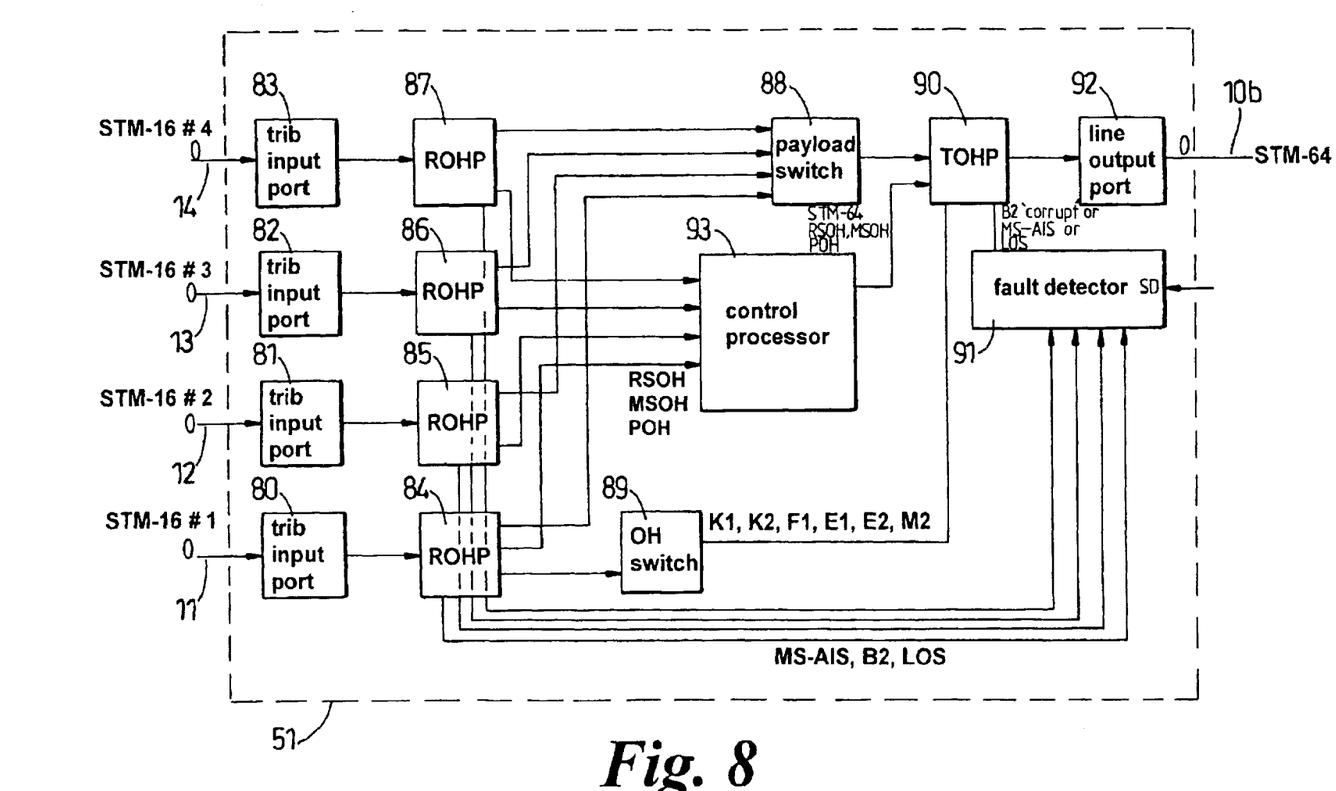
FIG. 8 is a block diagram of a transparent multiplexer according to a preferred embodiment of the invention.

FIG. 8 shows a block diagram of a transparent multiplexer according to the invention. The STM-16 trib signals are received at the trib input ports 80–83, which are at the optical/electrical interface. Each trib signal is processed by a trib ROHP 84–87. The payload bytes are extracted and sent to the payload switch 88, where they are multiplexed into the supercarrier STM-64 signal. The overhead bytes are separated from the STM-16 # 1 signal by ROHP 70 and sent to the OH switch 89 where the messaging information from the supercarrier STM-64 signal is extracted. TOHP 90 in combination with the control processor 91 maps the messaging information (both the essential messaging information and the desirable messaging information) into the correct byte position in the newly generated outgoing STM-64 overhead. The STM-64 signal is then converted from an electrical signal to an optical signal by the line output port 92.

Fault detector 93 is used to set signal conditioning (e.g. MS-AIS, LOS etc) on the outgoing STM-64 signal. The outgoing B2 byte of the STM-64 signal may be corrupted to the rate of the worst incoming STM-16 signal, or LOS or MS-AIS will be set if the incoming signal has failed or carries MS-AIS. This feature may be programmable by the operator, since it may not be necessary to corrupt the whole STM-64 signal if only one STM-16 has failed.

Pointer processing, synch station messaging, orderwire and B2 are all processed by the multiplexer/demultiplexers of the invention in the same way as prior art ADMs. E.g. pointer processing is performed to prevent data from being lost if the clock synch drifts, synch station messaging is performed to prevent synchronisation in the wrong direction, etc.

Figure 9A:
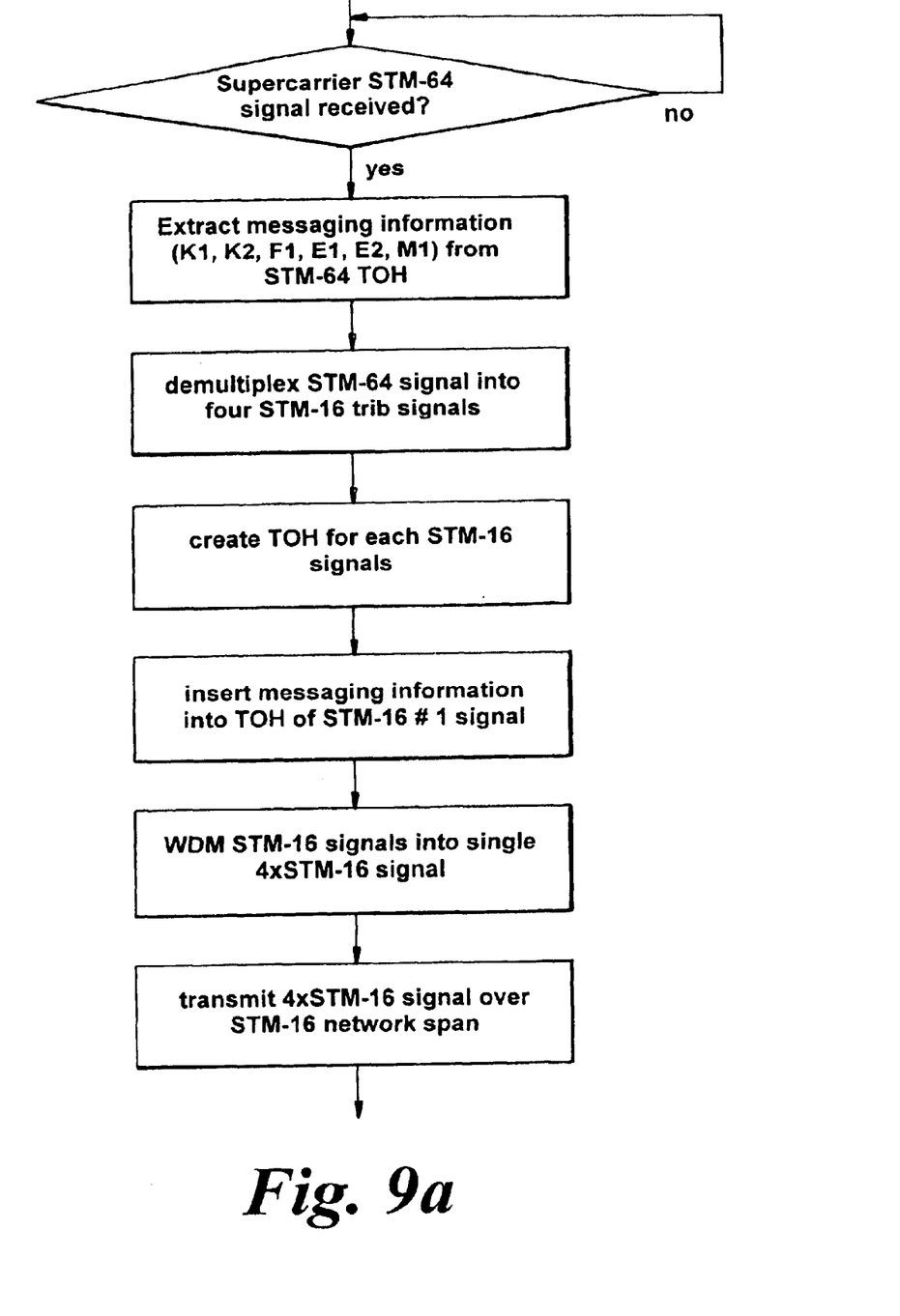
FIGS. 9a and 9b together constitute a flow chart of a preferred embodiment of the invention.
Figure 9B:
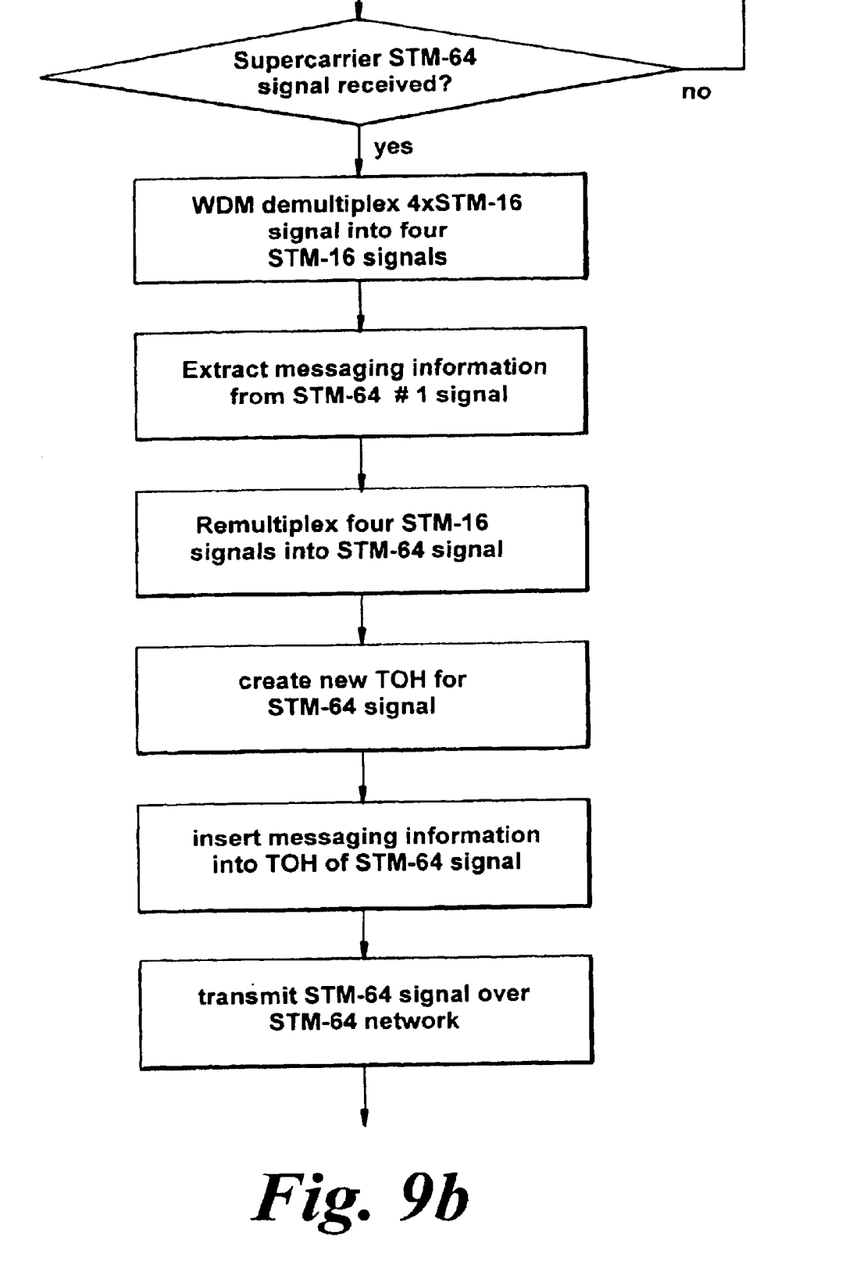

FIGS. 9a and 9b illustrate the steps taken in order to transmit an STM-64 supercarrier signal over an STM-16 network span. The method employed uses the network span arrangement of FIG. 4 and the transparent multiplexer/demultiplexer arrangement of FIGS. 7 and 8.

It will be immediately appreciated that the network span and the network may employ other protocols and that the invention is not limited to optical network systems.

I claim:

1. A method of transporting a supercarrier signal over a network span, the method comprising the steps of:

transmitting said supercarrier signal, including messaging information, using a first protocol;

transparently demultiplexing said supercarrier signal into a plurality of trib signals;

transmitting said trib signals over said network span using a second protocol;

whereby the messaging information required to maintain said first protocol is included in said trib signals; and after the transmission over the network span, transparently remultiplexing the trib signals into the supercarrier signal including the messaging information.

2. A method as claimed in claim 1, wherein the messaging information is used to transparently multiplex the trib signals into the supercarrier signal.

3. A method as claimed in claim 1, wherein each trib signal is multiplexed from a plurality of basic signals.

4. A method as claimed in claim 1, wherein the messaging information includes both essential messaging information and desirable messaging information.

5. Apparatus for transporting a supercarrier signal including messaging information, received using a first protocol; over a network span comprising a plurality of low bit rate network sections for transporting a plurality of trib signals using a second protocol; the apparatus having:

a transparent demultiplexer coupled to receive said supercarrier signal and demultiplex said supercarrier signal into said trib signals for transmission over said network span;

wherein said demultiplexer includes means for inserting into said plurality of trib signals the messaging information required to maintain said first protocol, and a multiplexer connected between said network span and said network, for transparently remultiplexing the trib signals into the supercarrier signals including the messaging information.

6. Apparatus as claimed in claim 5, wherein the trib signals may pass in both directions along the network span.

7. Apparatus as claimed in claim 5, wherein the information required to maintain the first protocol is extracted from the trib signals.

8. A component for a transparent demultiplexer comprising software arranged to control the demultiplexer to:

receive a supercarrier signal transported using a first protocol;

transmit a plurality of trib signals using a second protocol;

demultiplex said supercarrier signal into said trib signals; and extract from the supercarrier signal messaging information, required to recreate the supercarrier signal according to said first protocol, from the trib signals after transmission, and insert said messaging information into the trib signals.

9. A component for a transparent multiplexer comprising software arranged to control the multiplexer to:

transmit a supercarrier signal using a first protocol;

receive a plurality of trib signals transported using a second protocol;

multiplex said trib signals into said supercarrier signal; and extract messaging information from the trib signals and use said messaging information to recreate the supercarrier signal from the trib signals after transmission, according to said first protocol.

* * * * *